(12) United States Patent
Foster et al.

(10) Patent No.: US 10,600,025 B2
(45) Date of Patent: Mar. 24, 2020

(54) PRODUCT INTELLIGENCE ENGINE

(71) Applicant: Ent. Services Development Corporation LP, Houston, TX (US)

(72) Inventors: Stanley Neil Foster, Wixom, MI (US); Matthew E. Fuhrman, Pontiac, MI (US); Jonathan Robert Hague, Pontiac, MI (US); John Brabbs, Pontiac, MI (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 421 days.

(21) Appl. No.: 14/437,660

(22) PCT Filed: Oct. 26, 2012

(86) PCT No.: PCT/US2012/062053
§ 371 (c)(1),
(2) Date: Apr. 22, 2015

(87) PCT Pub. No.: WO2014/065806
PCT Pub. Date: May 1, 2014

(65) Prior Publication Data
US 2015/0339626 A1 Nov. 26, 2015

(51) Int. Cl.
*G06Q 10/08* (2012.01)
*G06F 17/50* (2006.01)
*G06Q 50/04* (2012.01)

(52) U.S. Cl.
CPC ......... *G06Q 10/0875* (2013.01); *G06F 17/50* (2013.01); *G06Q 50/04* (2013.01); *G06F 2217/02* (2013.01); *G06F 2217/06* (2013.01); *Y02P 90/30* (2015.11)

(58) Field of Classification Search
None
See application file for complete search history.

(56) References Cited

U.S. PATENT DOCUMENTS

| | | | |
|---|---|---|---|
| 6,983,187 | B2 | 1/2006 | Kern |
| 6,999,965 | B1 * | 2/2006 | Cesarotti ............... G06Q 10/06 |
| 8,195,525 | B2 | 6/2012 | Emerick |
| 8,290,830 | B2 | 10/2012 | Evans et al. |
| 2002/0123812 | A1 | 9/2002 | Jayaram |

(Continued)

FOREIGN PATENT DOCUMENTS

| | | |
|---|---|---|
| CN | 101606156 | 12/2009 |
| CN | 102262600 | 11/2011 |

(Continued)

OTHER PUBLICATIONS

Mark Keever, Information for Success, Oracle Accelerate for Midsize Companies: Customer Regerence Booklet, Mar. 2012, Oracle Corp~248 pages.

(Continued)

*Primary Examiner* — Allen C Chein
(74) *Attorney, Agent, or Firm* — Sheppard Mullin Richter & Hampton LLP

(57) ABSTRACT

In one example, a product intelligence engine for visualizing matching and non-matching ones of asynchronously-modifiable functional parts, physical parts, and virtual parts of a variant of a product.

15 Claims, 10 Drawing Sheets

(56) References Cited

U.S. PATENT DOCUMENTS

| | | | |
|---|---|---|---|
| 2004/0103375 A1* | 5/2004 | Chen | G06F 17/509 |
| | | | 715/243 |
| 2005/0278271 A1 | 12/2005 | Athony et al. | |
| 2008/0010620 A1* | 1/2008 | Moeller | G06Q 10/00 |
| | | | 716/103 |
| 2008/0189083 A1 | 8/2008 | Schell | |
| 2011/0251975 A1* | 10/2011 | Evans | G06F 17/50 |
| | | | 705/348 |

FOREIGN PATENT DOCUMENTS

| | | |
|---|---|---|
| JP | 2004264962 | 9/2004 |
| KR | 10-2002-0055452 | 7/2002 |

OTHER PUBLICATIONS

PCT Search Report/Written Opinion~Application No. PCT/US2012/062053~dated May 29, 2013~8 pages.
European Patent Application No. 12886958.3, Search Report dated May 23, 2016.

* cited by examiner

FIG. 1

FUNCTIONAL PART:  100 ⟶

CONFIGURATION DATA:

| PART IDENTIFIER 102 | VARIANT DATA 104 |
|---|---|
| FUNCTIONAL PART NAME | - PRODUCT<br>- LEVEL (E.G. ECONOMY/MIDGRADE/DELUXE)<br>- MODEL YEAR<br>- MANUFACTURING PLANT<br>- BUILD DATE<br>- REGION |

PHYSICAL PART:  120 ⟶

BILL-OF-MATERIALS DATA:

| PART IDENTIFIER 122 | PART DATA 124 |
|---|---|
| FUNCTIONAL PART NAME<br>-OR- PART # | - PRODUCT    - MFG'R<br>- LEVEL    - MFG'R'S PART #<br>- QUANTITY    - SPECS<br>- PART #    - DESCRIPTION<br>- BIN    - COST<br>   - COLOR<br>   - FUNCTIONAL PART NAME<br>   - PART IMAGE |

VIRTUAL PART:  140 ⟶

CAD DATA:

| PART IDENTIFIER 142 | GEOMETRY DATA 144 | METADATA 146 |
|---|---|---|
| FUNCTIONAL PART NAME<br>-OR- CAD FILENAME | - GEOMETRY<br>- MODEL<br>- LOCATION<br>- GROUPING | - FUNCTIONAL PART NAME<br>- CAD FILENAME<br>- PRODUCT<br>- LEVEL |

FIG. 4

402 — FUNCTIONAL PARTS (CONFIGURATION DATA)

| | PART IDENTIFIER | VARIANT |
|---|---|---|
| 312 | CABINET BODY | E, M, D |
| 314 | SHALLOW DRAWER | E, M, D |
| 316 | MEDIUM DRAWER | E, M, D |
| 328 | DEEP DRAWER | M |
| 326 | SIDE HANDLE | D |
| 318 | DRAWER HANDLE | E, M, D |
| 324 | DRAWER HANDLE TRIM | D |
| 322 | WHEEL ASSEMBLY | M, D |

404 — PHYSICAL PARTS (BOM DATA)

| PART IDENTIFIER |
|---|
| CABINET BODY |
| 5 INCH DRAWER |
| MEDIUM DRAWER |
| 24 INCH DRAWER |
| SIDE HANDLE |
| DRAWER HANDLE |
| DRAWER HANDLE TRIM |
| WHEEL ASSEMBLY |

406 — VIRTUAL PARTS (CAD DATA)

| PART IDENTIFIER |
|---|
| CABINET BODY |
| SHALLOW DRAWER |
| MEDIUM DRAWER |
| EXPANDED DRAWER |
| SIDE HANDLE |
| HANDLE |
| HANDLE TRIM |
| WHEEL ASSEMBLY |

VARIANT: PRODUCT = TOOLCHEST, LEVEL = MIDGRADE ← 502

| FUNCTIONAL ID | VIRTUAL ID | PHYSICAL ID | P/N | QTY | |
|---|---|---|---|---|---|
| CABINET BODY | CABINET BODY | CABINET BODY | 51597244 | 1 | M |
| SHALLOW DRAWER | SHALLOW DRAWER | 5 INCH DRAWER | 24879255 | 2 | M |
| MEDIUM DRAWER | MEDIUM DRAWER | MEDIUM DRAWER | 24972839 | 2 | M |
| DEEP DRAWER | EXPANDED DRAWER | 24 INCH DRAWER | 85547564 | 2 | M |
| DRAWER HANDLE | HANDLE | DRAWER HANDLE | 93100782 | 6 | M |
| WHEEL ASSEMBLY | WHEEL ASSEMBLY | WHEEL ASSEMBLY | 31098037 | 4 | M |

CONTEXT: TOOLCHEST MIDGRADE ← 504

FIG. 5

VARIANT: PRODUCT = TOOLCHEST, LEVEL = MIDGRADE

| FUNCTIONAL ID | VIRTUAL ID | PHYSICAL ID | P/N | QTY | |
|---|---|---|---|---|---|
| CABINET BODY | *** NO MATCH *** | CABINET BODY | 51597244 | 1 | NM |
| SHALLOW DRAWER | SHALLOW DRAWER | 5 INCH DRAWER | 24879255 | 2 | M |
| MEDIUM DRAWER | MEDIUM DRAWER | MEDIUM DRAWER | 24972839 | 2 | M |
| DEEP DRAWER | EXPANDED DRAWER | 24 INCH DRAWER | 85547564 | 2 | M |
| DRAWER HANDLE | HANDLE | DRAWER HANDLE | 93100782 | 6 | M |
| WHEEL ASSEMBLY | WHEEL ASSEMBLY | WHEEL ASSEMBLY | 31098037 | 4 | M |

CONTEXT: TOOLCHEST MIDGRADE

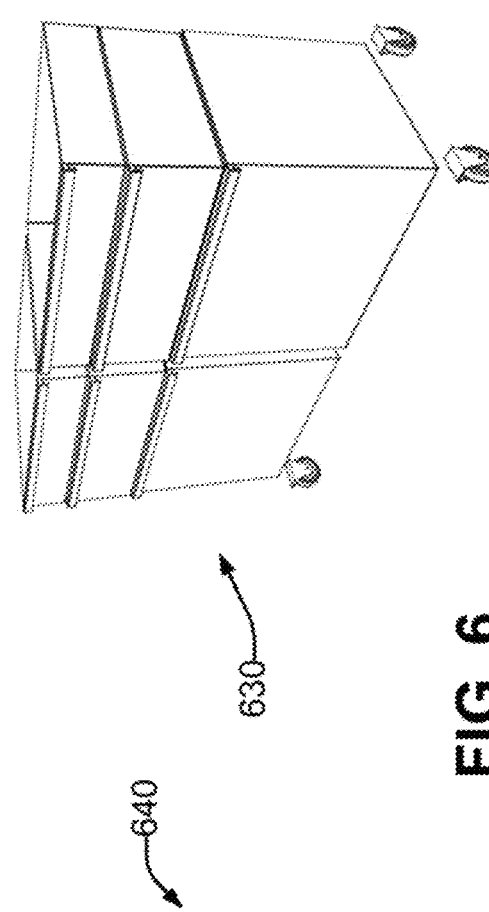

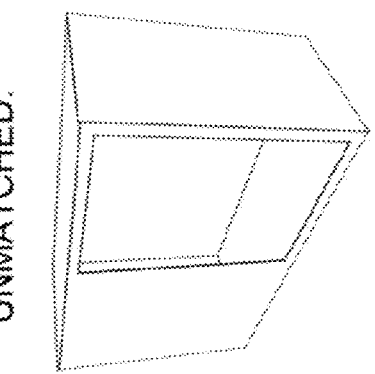

UNMATCHED:

FIG. 6

VARIANT: TOOLCHEST MIDGRADE

| FUNCTIONAL ID | VIRTUAL ID | PHYSICAL ID | P/N | QTY | |
|---|---|---|---|---|---|
| CABINET BODY | CABINET BODY | CABINET BODY | 51597244 | 1 | M |
| SHALLOW DRAWER | SHALLOW DRAWER | 5 INCH DRAWER | 24879255 | 2 | M |
| MEDIUM DRAWER | MEDIUM DRAWER | MEDIUM DRAWER | 24972839 | 2 | M |
| DEEP DRAWER | EXPANDED DRAWER | 24 INCH DRAWER | 85547564 | 2 | M |
| DRAWER HANDLE | HANDLE | DRAWER HANDLE | 93100782 | 6 | M |
| WHEEL ASSEMBLY | WHEEL ASSEMBLY | WHEEL ASSEMBLY | 31098037 | 4 | M |

CONTEXT: DRAWER ROW1 RIGHT

- RECEIVE FROM AT LEAST ONE EXTERNAL SYSTEM ASYNCHRONOUSLY-MODIFIABLE CONFIGURATION DATA THAT IDENTIFIES FUNCTIONAL PARTS OF PRODUCT VARIANTS, BILL-OF-MATERIALS DATA THAT DESCRIBES PHYSICAL PARTS OF THE VARIANTS, AND CAD DATA THAT DEPICT VIRTUAL PARTS OF THE VARIANTS 902

- RECEIVE A USER SELECTED VARIANT 904

- DISPLAY THE CAD DATA AND THE BOM DATA OF VIRTUAL PARTS & PHYSICAL PARTS THAT BOTH MATCH FUNCTIONAL PARTS 906
  - DETERMINE MATCHES & NON-MATCHES BETWEEN FUNCTIONAL PARTS & BOTH PHYSICAL & VIRTUAL PARTS 908
    - FOR THE FUNCTIONAL PARTS OF THE USER-SELECTED VARIANT 910
    - FOR THE FUNCTIONAL PARTS OF ALL VARIANTS 912
    - USING IDENTIFIERS, DATA, AND/OR METADATA ASSOCIATED WITH THE FUNCTIONAL, PHYSICAL, AND/OR VIRTUAL PARTS 914
      - USING A CHANGE HISTORY OF THE IDENTIFIERS AND/OR METADATA 916

- DISPLAY HELPER INFO FOR FUNCTIONAL PARTS THAT DO NOT MATCH BOTH A PHYSICAL & A VIRTUAL PART 918
  - PART HISTORY INFORMATION AND/OR GENERIC REPRESENTATIONS OF NON-MATCHING PARTS 920

PRODUCT INTELLIGENCE ENGINE

BACKGROUND

During the lifecycle of a product, many different functional groups of an organization or organizations may each play a role. Marketers may typically be involved with specifying features, options, or configurations for the product. Engineers and designers of various types are usually involved in designing the mechanical and functional aspects of the different modules or elements of the product. Manufacturing personnel determine how and where the product will be assembled. Supply chain and materials management personnel handle the details of specifying and interfacing with vendors of parts that can be sourced from around the world. Technical publication writers produce documentation that may be culled from the work product of all of these team members. Quality inspectors and assessors predict and evaluate the quality of the product. Continuing product engineers may evolve the product over time to add or improve features or respond to changes in parts made by vendors.

The products themselves may be of an almost infinite variety and scale, including, for example, computers, automobiles, electronic equipment, medical devices, mechanical devices, and many others.

Data about the work product produced, and consumed, by these and other personnel responsible for the product are typically maintained in electronic form in computer systems. Often different aspects of the work product are maintained, by a wide range of personnel, in different computer systems, using different databases and software applications, provided by different vendors. Often these may be legacy systems, put in place in different departments of an organization at different times, and tightly integrated with the processes of a particular department or organization.

As the product evolves over time, different personnel make changes to the product data as is appropriate to the scope of their responsibilities. For example, a marketeer may define a new product option or change an existing one, resulting in the addition or deletion of parts. A design engineer may change the shape of a part, or change the sub-parts that constitute it. A procurement specialist may substitute a cheaper or better part from a new vendor for a previous part. Such activities are a normal and beneficial part of product development and maintenance. However, they can also have adverse side effects.

BRIEF DESCRIPTION OF THE DRAWINGS

FIG. 1 is a schematic representation of configuration data, bill-of-materials data, and CAD data associated with a product in accordance with an example of the present disclosure.

FIG. 4 is a schematic representation of configuration data, bill-of-materials data, and CAD data, in accordance with an example of the present disclosure, corresponding to the example toolchest variants of FIG. 3.

FIG. 5 is a schematic depiction of an example screen display illustrating the matches determined for an example midgrade toolchest and viewed at the midgrade toolchest context, in accordance with an example of the present disclosure.

FIG. 6 is a schematic depiction of an example screen display illustrating the matches and non-matches determined for an example midgrade toolchest and viewed at the midgrade toolchest context, in accordance with an example of the present disclosure.

FIG. 9 is a flowchart in accordance with an example of the present disclosure of a method of visualizing a product.

DETAILED DESCRIPTION

Figure 2:
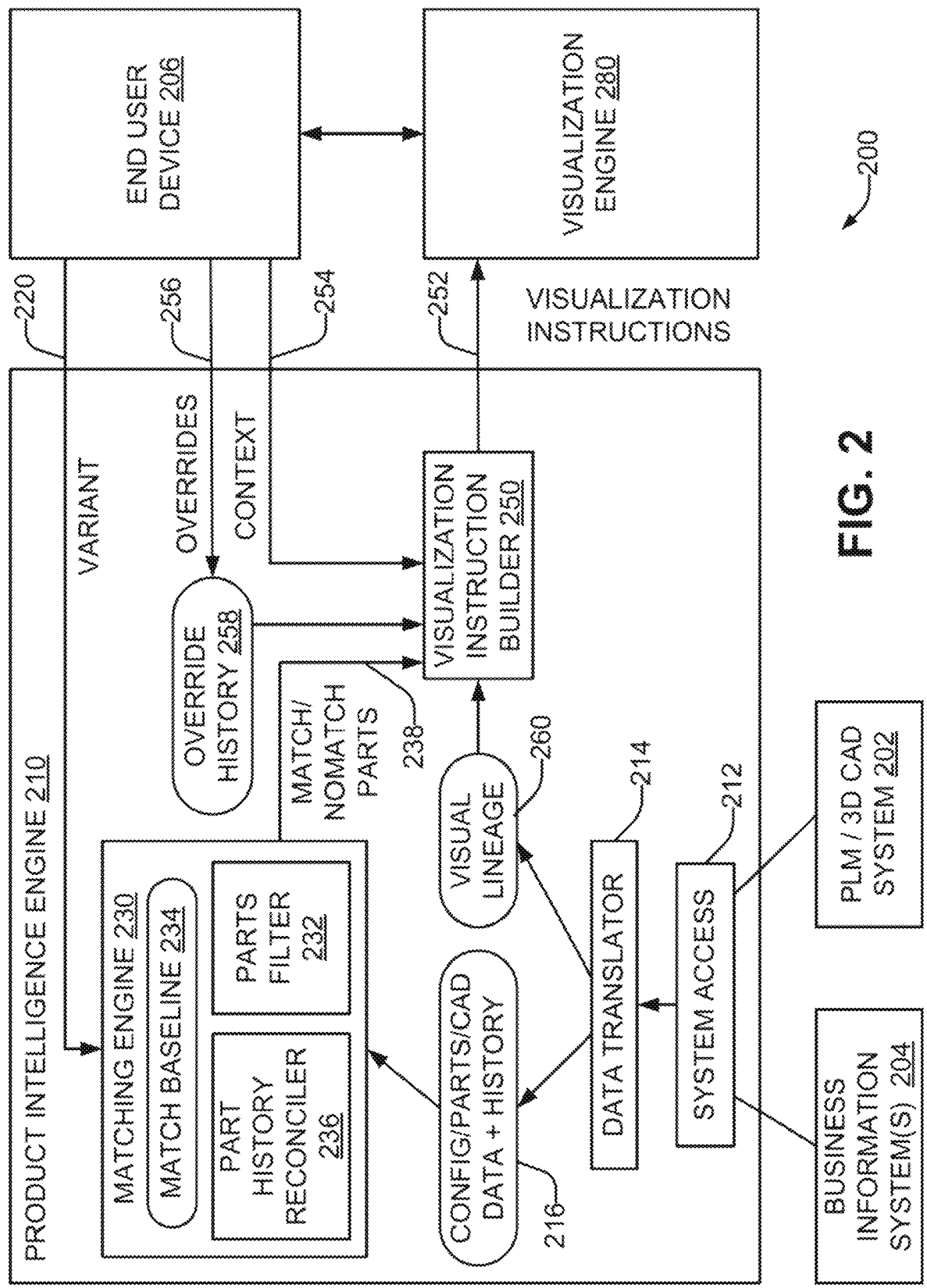
FIG. 2 is a schematic representation of a product intelligence system in accordance with an example of the present disclosure that processes asynchronously-modified configuration data, bill-of-materials data, and CAD data of FIG. 1 to determine matches and non-matches between functional, physical, and virtual parts and provide helper information usable to resolve the non-matches.
Figure 3:
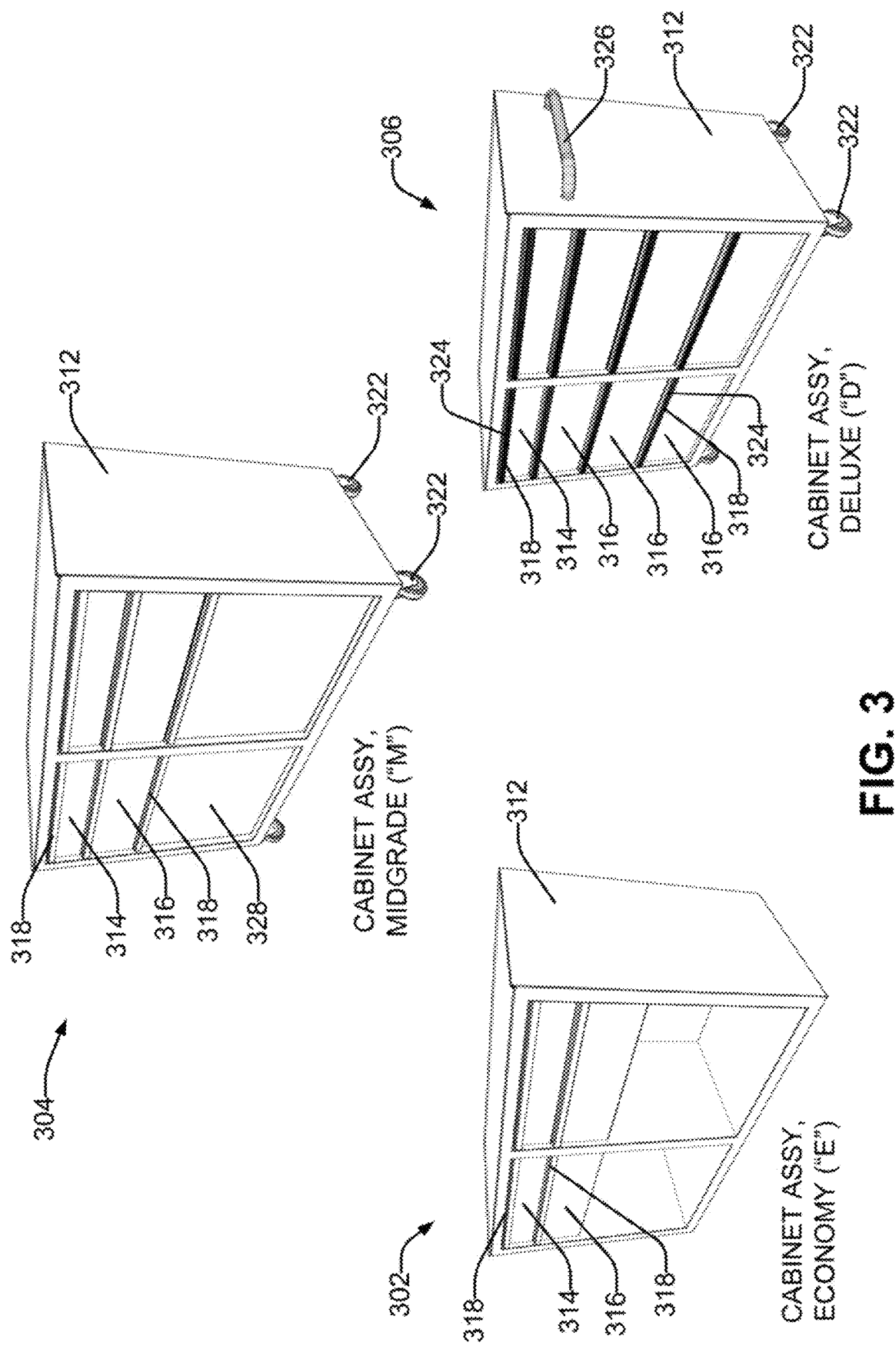
FIG. 3 is a perspective view of variants of an example toolchest product in accordance with an example of the present disclosure.

As noted in the Background section, different personnel make changes to certain portions of the product data as is appropriate to the scope of their responsibilities. Three types of product part data typically exist. The first type of product data is configuration data that identifies functional parts of variants of a product. Configuration data may be defined by or associated with an organization's marketing department, and may correspond to a product capability, feature, or option. A "variant", as defined herein and in the appended claims, shall be broadly understood to mean a version of a product that corresponds to a particular set of functional parts. As will be discussed subsequently in greater detail with reference to the drawings, an example toolchest product may be available in an economy, a midgrade, and a deluxe version. Thus three variants are identified: an economy toolchest, a midgrade toolchest, and a deluxe toolchest. A more complex example of a variant could be an automobile that is equipped with a particular set of options such as, for example, a particular engine, suspension, tires, audio package, and the like.

The second type of product data is bill-of-materials data that describes the physical parts of the variants. The bill-of-materials data is typically organized in a hierarchical form that mirrors the assemblies and sub-assemblies of the product as it is, or is to be, manufactured. For example, a physical part used in an assembly may itself be a lower-level subassembly of other physical parts. For a physical part, the bill-of-materials data typically includes at least its part number and the quantity of the part used at that level of the hierarchy.

The third type of product data is computer-aided design ("CAD") data that visually depicts virtual parts of the variants. The CAD data may be two-dimensional ("2D") or, more commonly, three-dimensional ("3D"). The CAD data for a virtual part typically describes its shape, size, and position or location in a product, absolute or relative to other virtual parts.

Where one or more of the configuration data, the bill-of-materials data, or the CAD data are maintained in applications, databases, and systems which are not integrated, a change made to the part data in one system does not cause a corresponding change to be made to the corresponding part data in other systems. Put another way, the parts data in one database is asynchronously-modifiable relative to the parts data of at least one other database. The resulting lack of data synchronization can be problematic for both the product and the organization as a whole.

Consider the example of a product with hundreds or even thousands of parts, such as an automobile. Dozens of users may make hundreds of changes to the functional, physical, and virtual parts over a period of time. Other users within the organization desire to view in an integrated manner the virtual and physical parts that correspond to the functional parts of a particular variant. Such users may be, for example, the writer of an owner or service manual that identifies replacement parts by reference to their visual appearance; a financial analyst attempting to identify the costliest parts of a product; a quality manager trying to ascertain product parts that exceed an allowable defect threshold; or a manufacturing team assembling the product.

However, an integrated view relies on having synchronized CAD, bill-of-materials, and functional part data. Typically the synchronization has been a manual process performed using spreadsheets, which are viewed and searched textually. Every time the parts data is integrated and aggregated, it is a manual process of matching every part/subassembly for the entire product. An added layer of complexity is that the user who manually generates the spreadsheets typically does not have access to the different databases and applications that maintain the part data, or the expertise to operate such applications. It can be appreciated that the manual process is time-consuming and error-prone, especially where there are hundreds or thousands of parts that make up a product and are to be matched. Furthermore, the history of changes to the various parts is typically difficult to access.

Moreover, due to the inconsistencies that often occur when parts data is maintained in separate systems, applications, and databases, it is beneficial to know not only the parts data that can be matched, but also the parts data that is mismatched. Manually discovering mismatched data is time-consuming and expensive because resolving the mismatches becomes more complex the further within a business process that the mismatch is discovered.

Referring now to the drawings, there is illustrated an example of a product intelligence engine constructed in accordance with the present disclosure which has a matching engine that determines matches and non-matches among asynchronously-modifiable functional parts, physical parts, and virtual parts. A visualization instruction builder in the product intelligence engine generates instructions that control a visualization engine to render, for a user-selected one of the variants, the CAD data and the bill-of-materials data for the matching parts, and to render for the non-matching parts helper information usable to resolve the non-matches.

Considering now in further detail the product part data, and with further reference to FIG. 1, the configuration data for each functional part 100 includes a functional part identifier 102 and variant data 104. Typically the functional part identifier 102 is a functional part name. The variant data 104 specifies, for the functional part 100, at least one variant for each of one or more variant characteristics. An example set of variant characteristics, for example, could include a product, a level, a manufacturing plant, a build date, a model year, a geographic region, and/or other characteristics. Other sets of variant characteristics may include more, fewer, or different characteristics. For the product characteristic, the specified variant could be, for example, a file cabinet, a toolchest, or a credenza. For the level characteristic of a toolchest product, the specified variant could be, for example, an economy model, a midgrade model, or a deluxe model. Other characteristics are analogous.

The bill-of-materials data for each physical part 120 includes a physical part identifier 122 and part data 124. Typically the physical part identifier 122 is a part number, or in some cases the functional part name corresponding to the physical part 120. The part data 124 specifies part characteristics for the physical part 120 identified by the physical part identifier 122. An example set of part characteristics, for example, could include a product (such as a toolchest), a level (such as economy, midgrade, or deluxe), a quantity, a bin location of the part, a part manufacturer, the manufacturer's part number (which may be different from the part number of the physical part identifier 122), and additional data about the part such as its specifications, description, cost, color, and/or image, among others. In addition, whichever one of the part number or the functional part name is not used as the physical part identifier 122 is included as a part characteristic in the part data 124.

The CAD data for each virtual part 140 includes a virtual part identifier 142, geometry data 144, and metadata 146. Typically the virtual part identifier 122 is the name of a CAD datafile that contains the geometry data, or in some cases the functional part name corresponding to the virtual part 140. The geometry data 144 and metadata 146 collectively specify part characteristics for the virtual part 140 identified by the virtual part identifier 142. The geometry data 144 typically includes a 3D virtual model that can be viewed from any angle, its location in 3D space as defined by transformation (movement) and rotation from a neutral design position, and a grouping of parts in virtual assemblies in which all parts can have shared transformation and rotation. In some cases the geometry data 144 may also include some non-geometric information such as, for example, a virtual texture or material applied to the virtual part in order to simulate the appearance of metal, plastic, wood, and the like. An example set of information specified by the metadata 146 could include, for example, a product and a level as have been described heretofore. In addition, whichever one of the CAD data filename or the functional part name is not used as the virtual part identifier 142 may also be included in the metadata 146.

Considering now a system that processes asynchronously-modified configuration data, bill-of-materials data, and CAD data to determine matches and non-matches between functional, physical, and virtual parts and provide helper information usable to resolve the non-matches, and with reference to FIG. 2, a system 200 includes a product intelligence engine ("PIE") 210. The PIE 210 is coupled to at least one external PLM/CAD system 202. The CAD data 140 is obtained from the PLM/CAD system 202. In some examples, the PLM/CAD system 202 may include a CAD subsystem and a PLM (product lifecycle management) subsystem; in other examples, these may be two separate systems. Typically, the CAD files with the geometry data 144 are obtained from the CAD system/subsystem, while the metadata 146 is obtained from the PLM system/subsystem. The metadata 146 is not included in the CAD files themselves, and cannot be determined solely from the CAD files. Examples of some commercially available PLM systems include Siemens Teamcenter, Dassault Enovia, PTC Windchill, and SAP PLM. Examples of some commercially available CAD systems include Siemens NX, Dassault CATIA, and PTC Pro E.

The PIE 210 is also coupled to at least one external business information system 204. The configuration data 100 and the bill-of-materials 120 are obtained from a business information system 204. In some examples, each is obtained from a different business information system 204. Examples of commercially available business information systems include Oracle Enterprise Business Suite and SAP ERP.

A system access module 212 in the PIE 210 defines interfaces to the PLM/CAD system(s) 202 and the business information system(s) 204. The system access module 212 has the knowledge and access privileges to obtain the data from the PLM/CAD system(s) 202 and the business information system(s) 204. As a result, a user of the PIE 210 advantageously does not require this knowledge or access privileges.

A data translator module 214 in the PIE 210 receives the data from the system access module 212 and transforms the data, which is stored in the systems 202,204 in a native format, into an internal format of the PIE 210 usable for further processing. In some examples, the native formats of at least two of the CAD data, the configuration data, and the bill-of-materials data are different. The data translator module 214 generates the functional part data 100, the physical part data 120, and the virtual part data 140, and stores this information in a part datastore 216. In some examples, the geometry data 144 itself may not be imported into the PIE, but rather the CAD filename that specifies the location on the CAD system/subsystem of the geometry data 144.

In addition to obtaining part data from the external systems 202,204, the system access module 212 also typically obtains part history data from these systems. Part change history data reflects changes made over time to the part data. For example, each time a part changes fit, form, or function, a new part number may be assigned to it. Consider the case where part number 1234 is replaced by part number 5678, which is then replaced by part number 9876. It can be appreciated that a change of this type made to a physical part or a virtual part can cause the functional part data 100, the physical part data 120, and the virtual part data 140 to get out of sync. For example, part 1234 may be a drawer that slides in and out of an opening. A new drawer is designed that is made from a different alloy that is more dent resistant, and given the part number 5678. Then the drawer is improved with a new baked-on paint, and given the part number 9876. In this case the physical part has changed, but the virtual part has not.

The part change history data, which is stored in the systems 202,204 in a native format, is transformed by the translator 214 into an internal format of the PIE 210 usable by the PIE 210 to help identify where a new part has replaced an older part in the product. The part history data typically indicates the sequence of such changes (e.g. 1234, to 5678, to 9876). The part history data may also be stored in the part datastore 216.

An end user device 206 is coupled to the PIE 210. A user interacts with the end user device 206 to communicate commands and data to the PIE 210. In order to initiate a part matching operation of the PIE 210, the user specifies a particular variant 220 of interest. To this end, the user may be presented, for example, with a fillable form that allows him to specify one or more of a product (e.g. a toolchest), a level (e.g. economy, midgrade, deluxe), a model year, a manufacturing plant, a build date, and a geographic region.

The specified variant data is provided to a matching engine 230 of the PIE 210. The matching engine 230 accesses the part data and part change history data stored in the datastore 216, and processes this data to determine matches and non-matches between the functional parts 100 and both the physical parts 120 and the virtual parts 140. In some examples, the determination of matches and non-matches is performed for all of the functional parts 100. In other examples, the determination of matches and non-matches is performed for the functional parts 100 that are included in the user-specified variant. For example, if the user specifies in the fillable form that the product="toolchest" and the level="midgrade", while leaving the other entries blank, then a parts filter 232 in the matching engine 230 filters the functional parts 100 to identify those parts 100 whose variant data 104 specifies that they are used in the midgrade toolchest, and then performs the matching operation. The results of the matching operation may be stored in a match baseline 234. Determining the matches and non-matches for all of the functional parts 100 takes more time than determining the matches and non-matches for a subset of the functional parts 100 that correspond to the specified variant. However, subsequent user requests for a different variant may be completed more quickly, as the stored match baseline 234 already contains the match/no-match results for all the functional parts 100. In addition, where the stored match baseline 234 is retained over time, the matching engine 230 can reuse the results stored in the baseline 234 for unchanged parts, and determine matches and non-matches for any added or changed parts. This also can advantageously speed up response time.

In some examples, the matching engine 230 first determines matches and non-matches using the part identifiers 102,122,142. Where these identifiers do not match, the matching engine 230 then further determines matches and non-matches using the characteristics of the physical parts and the virtual parts, such as the physical part data 124 and the virtual part metadata 146. Where the identifiers do not match, a part history reconciler 236 of the matching engine 230 processes the part change history data for the parts 100,120,140 to determine the matches and non-matches through reference to the changes made over time to the parts.

A visualization engine ("VE") 280 is used to communicate the results of the matching operations performed by the PIE 210 to the user. The end-user device 206 is coupled to the VE 280, with which the user can interact. The matches and non-matches 238 determined by the matching engine 230 for the user-specified variant 220 are communicated to a visualization instruction builder ("VIB") 250 in the PIE 210. Where the determination of matches and non-matches has been performed for all of the functional parts 100, the parts filter 232 first filters the results to those for the user-specified variant before communicating them to the VIB 250. The VIB 250 then builds a stream of visualization instructions 252 that are sent to the VE 280 to instruct the VE 280 how to display the matching and non-matching results to the end-user device 206. Examples of commercially available visualization engines include SAP Visual Enterprise, Team Center Visualization, and Anark Core.

The VIB 250 generates instructions that control the VE 280 to render, for the user-selected variant 220, tabular information about the matching parts and the non-matching parts. For the matching parts, the VIB 250 also generates instructions that control the VE 280 to render, for the user-selected variant 220, the CAD data and the bill-of-materials data for the matching parts. In addition, the CAD data is rendered in a user-specified visual context 254. The visual context specifies the product context at which the user desires to visualize the matches. For example, and as will be discussed subsequently in greater detail, the user may wish to visualize the entire toolchest, or only a particular drawer of the toolchest. In order to build the instructions for visualizing the matching parts in the specified context, the VIB 250 utilizes a visual lineage 260 of the product. The visual lineage 260 is generated by the data translator 214, typically by processing the geometry data 144 for the virtual parts 140 to build a part lineage tree that indicates a visual part hierarchy of variants of a product. In some examples, the VIB 250 locates the matching part in the lineage tree that corresponds to the user-specified context for the user-specified variant, and then builds instructions to visualize that part and its lower-level matching parts.

For the non-matching parts, the VIB 250 also generates instructions that control the VE 280 to render helper information that is usable to resolve the non-matches. A complete non-match occurs if a functional part is not matched by both a physical part and a virtual part. Where a complete non-match occurs, the helper information typically includes the part identifier of the non-matched functional part, and in some examples may also include some or all of the variant data for the functional part.

A partial non-match results when a functional part matches a physical part but not a virtual part, or when a functional part matches a virtual part but not a physical part. For example, if a functional part matches a virtual part but not a physical part, the helper information may include a generic image of the virtual part. As another example, if a functional part matches a physical part but not a virtual part, the helper information may include certain of the part data 124 for the physical part. In both cases the helper information may include part change history information for the non-matching parts.

Where non-matches occur, the user desires to resolve the non-matches. The helper information presented to the user by the VE 280 can assist the user in resolving the non-matches. In some cases, the user resolves the non-matches by arranging to have one or more of the parts 100,120,140 modified in the business information system(s) 204 and/or the PLM/CAD system(s) 202. In other cases, the user resolves the non-matches by specifying override data 256 to the PIE 210. The override data 256 may instruct the VIB 250 to ignore a non-match, or may instruct the VIB 250 how to resolve the non-match. For example, the user could determine that, due to a gap in the history data, the physical part having part identifier A matches the virtual part having part identifier B, and could specify this to the PIE 210 as override data 256. The override data 256 may be stored in an override history store 258 in the PIE 210 for persistence during subsequent matching operations for other variants, or over time.

The operation of the product intelligence system 200 with regard to an example set of configuration, bill-of-materials, and CAD data, will now be considered with reference to FIGS. 3-9. Considering now an example toolchest product, and with reference to FIG. 3-4, the toolchest product is available in three levels: economy 302, midgrade 304, and deluxe 306. The three level toolchests each share some parts in common: a cabinet body 312, shallow drawers 314, medium drawers 316, and drawer handles 318. The midgrade 304 and deluxe 306 toolchests share wheel assemblies 322. Deluxe toolchest 306 uses drawer handle trim 324 and side handle 326. Midgrade toolchest 304 uses deep drawer 328. It will be appreciated that toolchests 302-306 use multiples of parts 314-324, 328 but, for clarity of illustration, not all of the multiples are marked with reference designators.

Considering now the parts data associated with the toolchest product, and with reference to FIG. 4, a portion of the configuration data, bill-of-materials data, and CAD data for the toolchest product is illustrated. Example configuration data 402 has eight functional parts, which correspond to parts 312-328 of FIG. 3. The portion of the variant data illustrated for each functional part shows the level field that indicates in which of the economy level toolchest 302 ("E"), the midgrade level toolchest 304 ("M"), and the deluxe level toolchest 306 ("D") the corresponding functional part is used. For example, the configuration data indicates that the shallow drawer 314 is used in all three toolchest levels E, M, D, while the deep drawer 328 is used in the midgrade toolchest level M.

For each functional part 312-328, the part identifiers for the corresponding physical parts in the bill-of-materials data 404 and the virtual parts in the CAD data 406 are illustrated in the same row of FIG. 4. It can be appreciated that for some parts, such as the cabinet body 312, the part identifier is the same for the functional, physical, and virtual part. For other parts, some or all of the part identifiers of a particular part are different.

FIG. 5 illustrates an example screen display 500 on the end user device 206. The display 500 is generated by the visualization engine 280 (FIG. 2) in response to visualization instructions 252 that are generated by the product intelligence engine 210. The PIE 210 generates the visualization instructions 252 responsive to user input of a variant 220 and a context 254 based on the example configuration data 402, bill-of-materials data 404, and CAD data 406 of FIG. 4. In this example, the user specifies a desired variant 502 for the midgrade level of the toolchest product. The user also specifies a desired visual context 504 for displaying the CAD data of matching parts is the entire midgrade toolchest. Once these user selections have been input, the PIE 210 obtains and translates the data from the systems 202,204, performs the matching operation with matching engine 230, and generates the visualization instructions 252 with the visualization instruction builder 250. The visualization instructions 252 are communicated to the visualization engine 280 which in turn generates the display 500 presented on the end user device 206.

Considering the matching operation in greater detail for the example configuration data 402, assume that the parts filter 232 is first used to filter the complete set of functional parts 402 to identify those which are specific to the midgrade toolchest. The filtering operation determines that the side handle 326 and drawer handle trim 324 functional parts are not used in the midgrade toolchest, and thus no matching will be attempted for these parts. The matching engine 230 then performs a matching operation among the configuration data 402, bill-of-materials data 404, and CAD data 406 for the functional parts for the cabinet body 312, shallow drawer 314, medium drawer 316, deep drawer 328, drawer handle 318, and wheel assembly 322. The cabinet body 312, medium drawer 316, and wheel assembly 322 can be matched using their part identifiers, which are the same for the functional, physical, and virtual parts. However, in the case of the functional parts for the shallow drawer 314, deep drawer 328, and drawer handle 318, the part identifiers for the physical part and/or the virtual part do not match the functional part identifier. Therefore, part characteristics and/or the part change history for the physical part and/or the virtual part are processed by the matching engine 230 to determine whether matches for the functional part exist. For example, assume that the physical part identifier for the shallow drawer 314 was changed from "shallow drawer" to "5 inch drawer" at some previous point in time. The matching engine 230 processes the change history of the physical parts and determines that the physical part with the part identifier "5 inch drawer" is the current part identifier for the shallow drawer 314. As another example, assume that the virtual part identifier for the deep drawer 328 was changed from "deep drawer" to "expanded drawer" at some previous point in time. The matching engine analyzes the metadata 146 (FIG. 1) and/or the geometry data 144 for the virtual parts and determines that the virtual part with the part identifier "expanded drawer" is the current part identifier for the deep drawer 328. For example, the metadata 146 could indicate that this virtual part is used in the midgrade toolchest.

The visualization instructions 252 generated for the example data of FIG. 4, processed by the visualization engine 280, result in the screen display 500. The screen display 500 includes a tabular portion 510. The tabular portion typically indicates the various functional parts of the variant 502 and their matching virtual parts and physical parts. In table 510, each row corresponds to a different functional part and its matching virtual part and physical part. The functional part identifiers are shown in column 512, the virtual part identifiers in column 514, and the physical part identifiers in column 516. Additional information about the parts may also be displayed. In table 510, for example, the physical part number is displayed in column 518, and the quantity of the physical part used in the variant is displayed in column 510. An "M" in column 522 indicates that the corresponding functional part has been matched to both a virtual part and a physical part. It can be appreciated that, in other examples, different arrangements of the tabular portion and different data for the parts may be displayed.

The screen display 500 also includes a visual portion 530. The visualization engine 280, as instructed by the visualization instructions 252, uses the CAD data for the matching parts to visually display the results of the matching operations. In some examples, the image displayed in the visual portion 530 can be manipulated (e.g. rotated, scaled, etc.) by the user interacting with the visualization engine 280.

The screen display produced by the system 200 can assist the user in resolving non-matched parts. Consider, with reference to FIG. 6, an example screen display 600 for a case where the product intelligence engine 210 determines that a non-match exists for a particular functional part. Assume that for the functional part for the cabinet body 312, a matching physical part is found, but a matching virtual part could not be found. This is indicated in the tabular portion 610 by a "*No Match*" entry for the virtual ID in column 614, and the "NM" (no match) indicator in column 622. Thus the tabular portion 610 provides helper information in the form of an identification of the functional part that could not be matched, and an identification of which of the virtual part and/or the physical part could not be matched to that functional part.

The visual portion 630 illustrates an image that corresponds to the results of the matching operations. The various drawers and wheels of the midgrade toolchest are illustrated in the visual portion 630, but there is no cabinet body included in the visual portion 630 since no virtual part corresponding to the cabinet body was matched. It can be appreciated that the drawers and wheel assemblies illustrated in the visual portion 630 are correctly positioned but are effectively "floating" because there is no cabinet body tying them together.

The screen display 600 also includes additional helper information. In this example, the helper information includes a generic depiction 640 of a cabinet body. This depiction 640 may, for example, be a part image included in the part data 124 (FIG. 1) for the cabinet body physical part 312. It can be appreciated that the generic depiction 640 of the cabinet body is not the proper cabinet body since some of its features are different; for example, the generic cabinet body 640 illustrated would not accommodate the left column of drawers illustrated in the visual portion 630. However, the generic cabinet body 640 provides sufficient general information about the non-matched part to assist a user in resolving the non-match.

Figure 7:
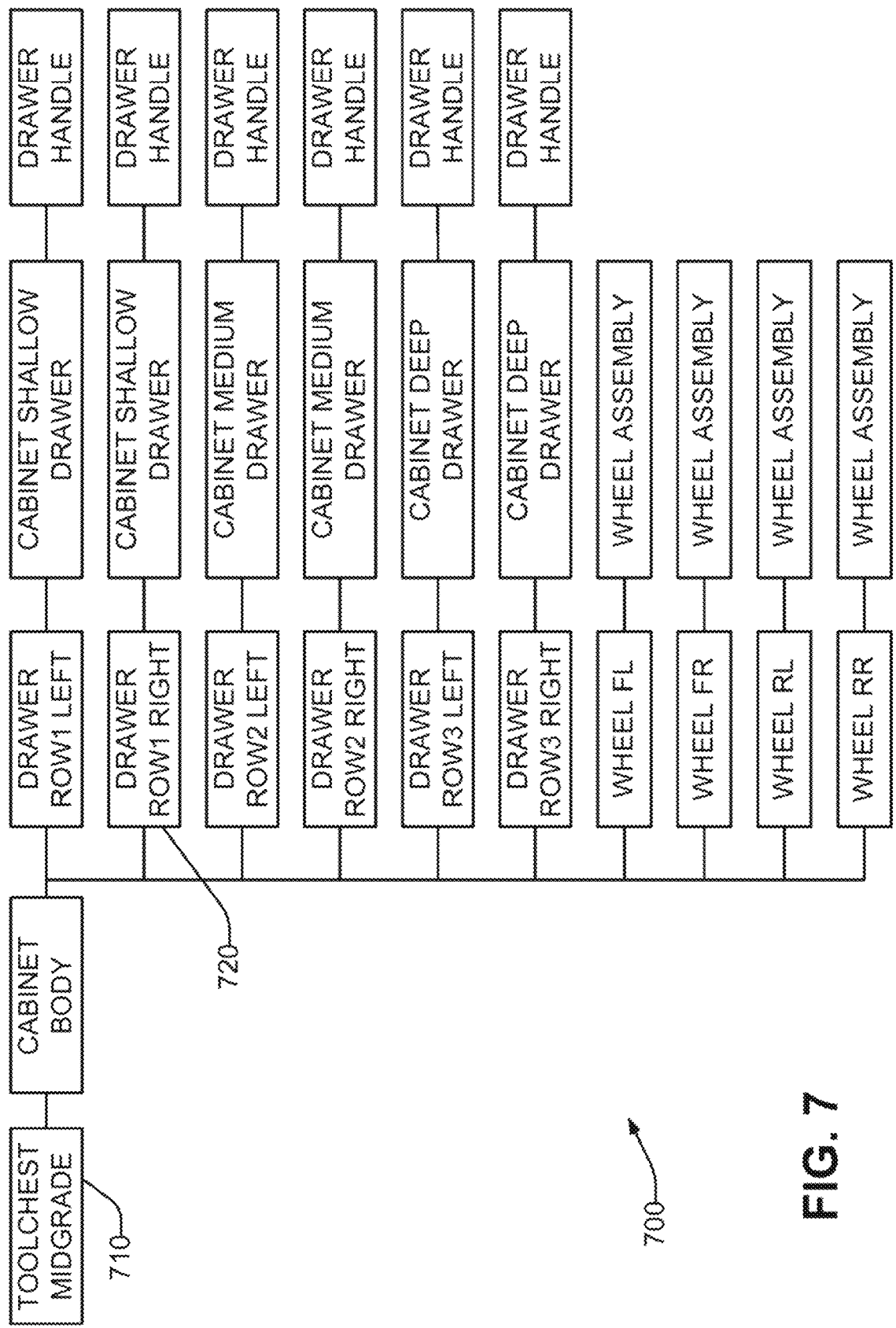
FIG. 7 is an example visual lineage that defines various viewing contexts usable for screen displays of the matches and non-matches, in accordance with an example of the present disclosure.
Figure 8:
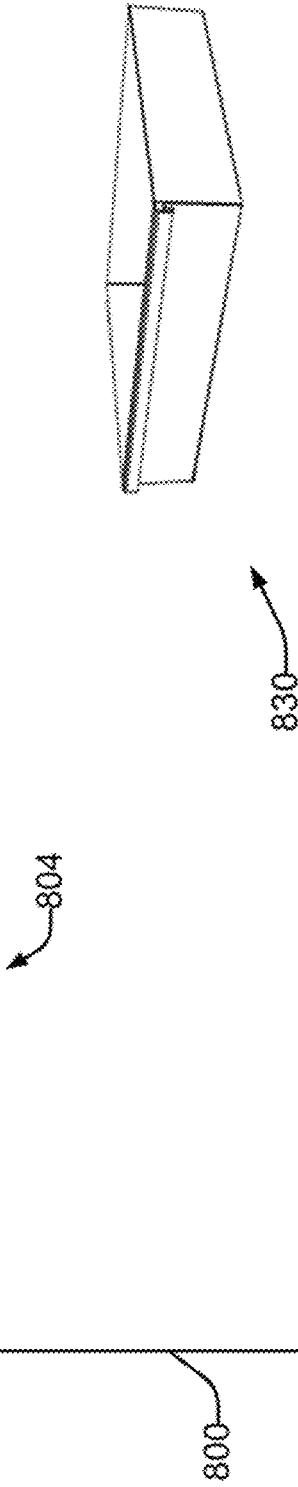
FIG. 8 is a schematic depiction of an example screen display illustrating the matches determined for an example midgrade toolchest and viewed at a top right drawer context, in accordance with an example of the present disclosure.

Considering now in greater detail the visual context used for the screen displays 500,600, and with reference to FIG. 7, the visual context is derived from the visual lineage 260 (FIG. 2). As has been discussed heretofore, the visual lineage 260 is generated by the data translator 214 and indicates a visual part hierarchy of a variant. In the example visual lineage 700 for the variant of the midgrade toolchest, parents are illustrated to the left, and children to the right. Each box of lineage 700 corresponds to a user-selectable visual context. When the box for a particular context is selected, the screen display will contain a depiction of the virtual parts for that box, and for all boxes in the tree that are to the right of the selected box.

The "Toolchest Midgrade" visual context 504,604 of FIGS. 5-6 corresponds to the Toolchest Midgrade box 710 of the visual lineage 700. The Toolchest Midgrade box 710 causes all matched parts at or below that level—i.e. the cabinet body, drawers, drawer handles, and wheel assemblies—to be displayed in the visual portion 530,630. Now consider, and with reference to FIG. 8, the effect of a change in the visual context from the "Toolchest Midgrade" context 504 to the "Drawer Rowl Right" context 804. The "Drawer Rowl Right" context 804 corresponds to the Drawer Rowl Right box 720 of the visual lineage 700. As a result, all matched parts at or below that level—i.e. the shallow cabinet drawer and drawer handle of the topmost right cabinet slot—to be displayed in the visual portion 830. In the case of non-matches, changing the context can assist the user in resolving them by visually focusing in more specifically on the portion of the product affected by the non-match.

Consider now, with reference to FIG. 9, a flowchart of a method of visualizing a product. Alternatively, the flowchart of FIG. 9 may be considered as steps in a method implemented by computer-readable instructions executed by a processor. The method 900 begins at 902 by receiving at a product intelligence engine, from at least one external system, configuration data that identifies functional parts of variants of a product, bill-of-materials data that describes physical parts of the variants, and CAD data that visually depicts virtual parts of the variants. The configuration data, bill-of-materials data, and CAD data are independently and asynchronously modifiable. At 904, a user selection of one of the variants is received at the engine.

At 906, the CAD data and the bill-of-materials data of virtual parts and physical parts that both match functional parts are displayed. In some examples, at 908, matches and non-matches between the functional parts and both the physical parts and the virtual parts are determined with the product intelligence engine. In some examples, at 910, the determining is performed for the functional parts of the user-selected one of the variants; while in other examples, at 912, the determining is performed for all of the functional parts. In some examples, at 914, the determining is performed using one or more of part identifiers, part data, and part metadata associated with the functional, physical, and/or virtual parts.

At 918, helper information usable to resolve the non-matches is displayed for functional parts that do not match both a physical part and a virtual part. In some examples, at 920, the helper information includes part history information for the non-matching parts, and/or generic visual representations of the non-matching parts.

Figure 10:
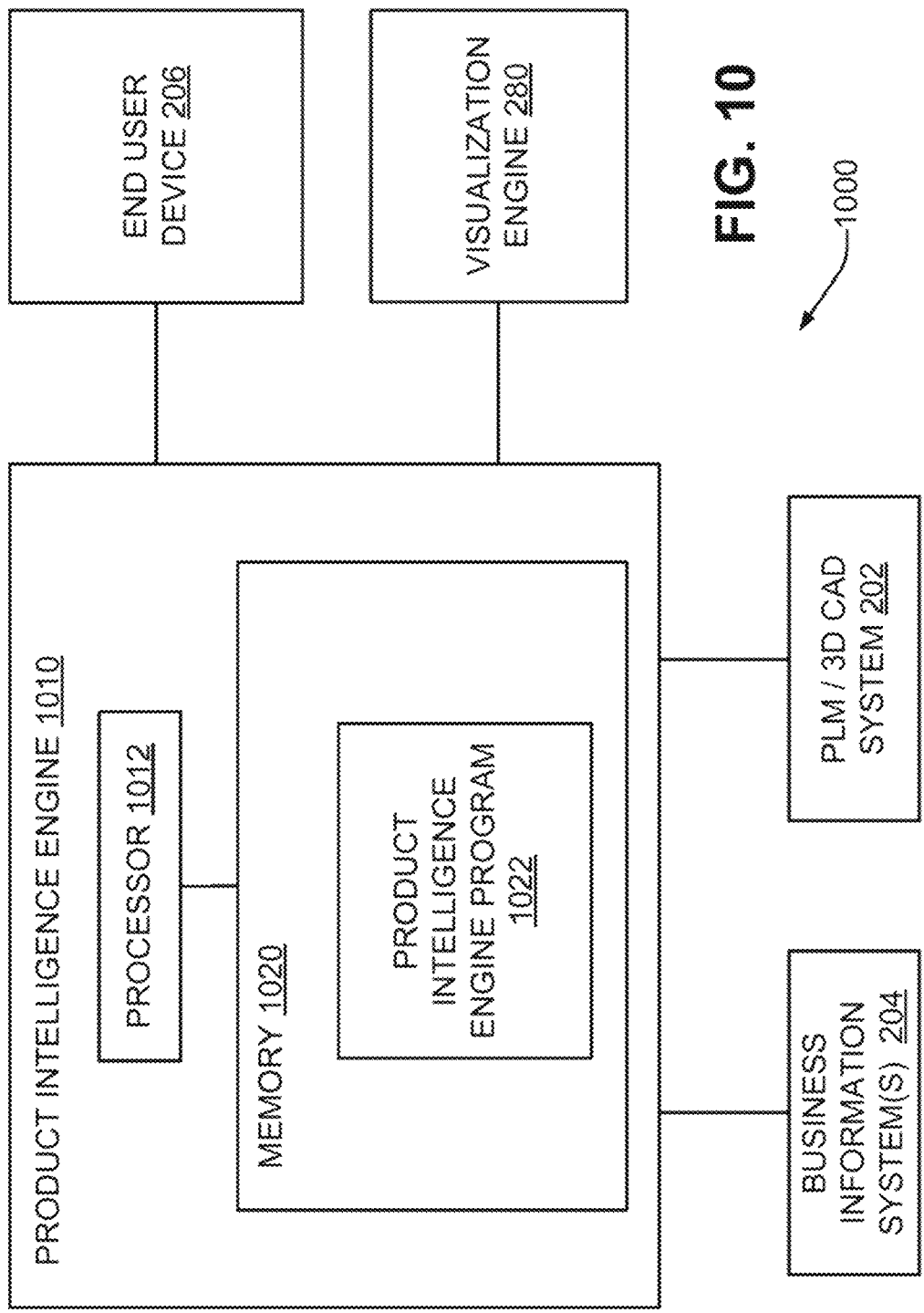
FIG. 10 is another schematic representation of a product intelligence system in accordance with an example of the present disclosure usable to perform the method of FIG. 9.

Considering now another system that processes asynchronously-modified configuration data, bill-of-materials data, and CAD data to determine matches and non-matches between functional, physical, and virtual parts and provide helper information usable to resolve the non-matches, and with reference to FIG. 10, a system 1000 includes a product intelligence engine ("PIE") 1010. The PIE 1010 has a processor 1012 coupled to a memory 1020. The memory 1020 includes a product intelligence engine program 1022 stored in the memory 1020. The program 1022 has instructions that are executable by the processor 1012 to implement the functionality of the product intelligence engine. In some examples the product intelligence engine 1010 may be the product intelligence engine 210.

From the foregoing it will be appreciated that the engine and method provided by the present disclosure represent a significant advance in the art. Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in a particular order.

Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. Terms of orientation and relative position (such as "top," "bottom," "side," and the like) are not intended to require a particular orientation of any element or assembly, and are used only for convenience of illustration and description. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A product intelligence engine, comprising:
   interfaces to receive from at least one external system asynchronously-modifiable configuration data that identifies functional parts of variants of a product, wherein the configuration data for each functional part includes at least a functional part identifier and variant data indicating in which of the variants the functional part is used,
   bill-of-materials data that describes physical parts of the variants, wherein each functional part is associated with one or more physical parts, wherein the bill-of-materials data for each physical part includes at least a physical part identifier; and
   CAD data that visually depicts virtual parts of the variants, wherein the CAD data includes a virtual part identifier;
   a matching engine to determine, for a user-selected variant of the variants, matches and non-matches between the functional parts and both the physical parts and the virtual parts, wherein the matches associate each functional part identifier with a physical part identifier and a virtual part identifier; and
   a visualization instruction builder to generate instructions that control a visualization engine to render, for the user-selected one of the variants, the CAD data and the bill-of-materials data for the matching parts, and to render for the non-matching parts helper information usable to resolve the non-matches, the helper information including at least a corresponding part number of at least one non-matching part, the visualization engine also rendering a graphical illustration of the user-selected one of the variants, the graphical illustration being generated based at least in part on the matching parts and the non-matching parts, wherein at least one part among the matching parts corresponds to a hierarchy of parts that includes one or more child parts, and wherein the graphical illustration is generated to also visually depict the one or more child parts.

2. The engine of claim 1, wherein a change made to one of the functional, physical, or virtual parts does not cause a corresponding change to be made to the other corresponding ones of the functional, physical, or virtual parts.

3. The engine of claim 1,
   wherein the matching engine further determines the matches and non-matches using an identifier of the functional parts, the physical parts, and the virtual parts; and
   wherein, if the identifiers do not match, the matching engine further determines matches and non-matches using characteristics of the physical parts and the virtual parts.

4. The engine of claim 3, wherein the characteristics comprise at least one of part data or part metadata.

5. The engine of claim 3, comprising:
   a part history reconciler that determines matches and non-matches using a change history of the identifier or the metadata.

6. The engine of claim 1,
   wherein the product intelligence engine derives from the CAD data a set of visual contexts that specifies, for each context, a set of the virtual parts that are included in the context; and
   wherein the visualization instruction builder generates, for a user-selected one of the visual contexts, instructions that control the visualization engine to render the CAD data for the matching virtual parts that are included in the set.

7. The engine of claim 1, wherein the helper information comprises at least one of history information of the non-matching parts, descriptive information of the non-matching parts, or generic visual representations of the non-matching parts.

8. The engine of claim 1 wherein, during a first operation, the matching engine stores a baseline of the matches and the non-matches, and
wherein, during a subsequent operation, the matching engine determines matches and non-matches for added or changed functional parts, physical parts, or virtual parts and uses the stored baseline for unchanged functional parts, physical parts, and virtual parts.

9. The engine of claim 1, wherein the visualization instruction builder modifies the matches and the non-matches according to user-provided overrides.

10. The engine of claim 1, comprising:
a data translator that defines how the interfaces transform each of the CAD data, the configuration data, and the bill-of-materials data from a native format of the corresponding external system into an internal format of the product intelligence engine.

11. A method of visualizing a product, comprising:
receiving at a product intelligence engine, from at least one external system, asynchronously-modifiable configuration data that identifies functional parts of variants of a product, wherein the configuration data for each functional part includes at least a functional part identifier and variant data indicating in which of the variants the functional part is used,
bill-of-materials data that describes physical parts of the variants, wherein each functional part is associated with one or more physical parts, wherein the bill-of-materials data for each physical part includes at least a physical part identifier; and
CAD data that visually depicts virtual parts of the variants, wherein the CAD data includes a virtual part identifier;
receiving at the engine a user selection of one of the variants;
providing for display the CAD data and the bill-of-materials data of virtual parts and physical parts that both match functional parts of a user-selected variant, wherein each functional part identifier corresponding to each of the functional parts is associated with a physical part identifier and a virtual part identifier corresponding to the matched functional part;
providing for display, for functional parts that do not match both a physical part and a virtual part, helper information usable to resolve the non-matches, the helper information including at least a corresponding part number of at least one non-matching part; and
providing for display a graphical illustration of the user-selected one of the variants, the graphical illustration being generated based at least in part on the CAD data and the bill-of-materials data of virtual parts and physical parts that both match functional parts and functional parts that do not match both a physical part and a virtual part, wherein at least one part among the matching functional parts corresponds to a hierarchy of parts that includes one or more child parts, and wherein the graphical illustration is generated to also visually depict the one or more child parts.

12. The method of claim 11, comprising:
determining, with the engine, matches and non-matches between the functional parts and both the physical parts and the virtual parts.

13. The method of claim 12, wherein the determining is performed for the functional parts of the user-selected one of the variants.

14. The method of claim 12, wherein the determining is performed for all of the functional parts.

15. The method of claim 12, wherein the determining is performed using at least one of part data or part metadata associated with at least one of the functional parts, the physical parts, or the virtual parts.

* * * * *